(12) United States Patent
Yokota

(10) Patent No.: US 6,981,801 B2
(45) Date of Patent: Jan. 3, 2006

(54) ROLLER BEARING CAGE

(75) Inventor: Yasunori Yokota, Kanagawa-ken (JP)

(73) Assignee: Nippon Thompson Co., Ltd., Tokyo (JP)

( * ) Notice: Subject to any disclaimer, the term of this patent is extended or adjusted under 35 U.S.C. 154(b) by 58 days.

(21) Appl. No.: 10/687,800

(22) Filed: Oct. 20, 2003

(65) Prior Publication Data
US 2004/0081382 A1 Apr. 29, 2004

Related U.S. Application Data

(62) Division of application No. 10/028,829, filed on Dec. 28, 2001, now Pat. No. 6,666,584.

(30) Foreign Application Priority Data

Dec. 28, 2000 (JP) ........................................ 2000-400337

(51) Int. Cl.
F16C 33/46 (2006.01)

(52) U.S. Cl. ...................................................... 384/577
(58) Field of Classification Search ................. 384/577, 384/570, 572, 580, 574, 578
See application file for complete search history.

(56) References Cited

U.S. PATENT DOCUMENTS

| | | | |
|---|---|---|---|
| 4,881,830 A | 11/1989 | Shepard et al. | |
| 5,214,850 A | 6/1993 | Motohashi et al. | |
| 6,068,406 A | 5/2000 | Yoshida et al. | |

FOREIGN PATENT DOCUMENTS

| | | |
|---|---|---|
| EP | 0 754 082 | 1/1997 |
| JP | 168014/1989 | 11/1989 |
| JP | 6746/1994 | 1/1994 |
| JP | 219149/1996 | 8/1996 |
| JP | 72332/1997 | 3/1997 |
| JP | 240660/2000 | 9/2000 |

OTHER PUBLICATIONS

Patent Abstract of Japan, Publication No. 2000240660, Publication Date Sep. 5, 2000.

Primary Examiner—Xuan Lan Nguyen
Assistant Examiner—Melanie Torres
(74) Attorney, Agent, or Firm—Browdy and Neimark, P.L.L.C.

(57) ABSTRACT

A roller bearing cage is disclosed in which a pair of semicircular cage halves is assembled with their mating ends thereof coming into abutment against each other. The mating ends are chamfered off to stave off bearing failure resulting from any deformation that might occur at the areas nearby the mating ends owing to large centrifugal force imposed by high-speed engines. The roller bearing cage may be completed by only joining together the semicircular cage halves with their diametral mating ends coming into engagement with one another. Each of the semicircular cage halves is composed of axially opposing semicircular rims and cage bars interposed between the rims, thus helping ensure stiffness with even weighing less. The chamfering operation is done to make even any outer peripheral areas nearby the mating ends, preparatory to cutoff operation to split a cylindrical cage stock into two halves. This helps the process management of material-removal work to make the chamfered even areas.

3 Claims, 7 Drawing Sheets

ROLLER BEARING CAGE

The present application is a Division of prior application Ser. No. 10/028,829, filed Dec. 28, 2001 now U.S. Pat. No. 6,666,584.

BACKGROUND OF THE INVENTION

1. Field of the Invention

The present invention relates to a roller bearing cage applied to, for example a lower, larger end called a rod "big end" of a connecting rod in an engine and more particularly to a roller bearing cage suitable for use in a split shell roller bearing designed to fit around a crankshaft in which crankpins are made integrally with crank webs.

2. Description of the Prior Art

As the modern engines are needed to get further higher in horsepower, the crankshaft for the powerful engines has to be made so as to stand up to further high-speed revolution. To cope with this, the crankpins are made integral with the crank webs to enhance the rigidity or stiffness of the crankshaft. Split shell roller bearings, because of the integral construction of the crankpin with the associated crank webs, are inevitably required at the rod big-ends of the connecting rods and correspondingly the cage is also needed to be made in any split type. High-compression, high-speed engines, moreover, impose very harsh conditions to the bearings.

An example of conventional bearing cages is disclosed in Published Unexamined Patent Application in Japan No.H08-219 149. The prior bearing cage is made in a configuration resembling any gate in cross section and envisaged to carry effectively the loads imposed by modern high-speed engines. To this end, the cage is made on the outside periphery thereof with the retaining projections to keep the rollers against their escape out of the cage.

Another example of the bearing cage having a gate-like configuration in cross section is disclosed in Published Unexamined Utility Model Application in Japan No.H01-168 014. The prior bearing cage is also directed to keep the rollers against their escape out of the cage, thereby carrying well the heavy loads imposed by high-speed engines. To this end, the bearing cage, as illustrated in FIG. 1 of the above citation, has a partition separating two adjacent pockets, the thin area of which is made with projections that extend inside the pockets slightly beyond the flanks of the thickened areas to serve for keeping the rollers against their radially outward escape out of the cage.

Published Unexamined Patent Application in Japan No. 2 000-240 660 discloses a roller bearing retainer split into two haves, which is favorable for the crankshaft having crankpins formed integrally with the crank webs. The prior roller bearing retainer is designed in such a way reduced in an outside diameter thereof as nearing the diametral opposing abutment ends of the retainer halves to be made in a somewhat oval shape. The construction recited above is envisaged to keep the retainer against any unfavorable deformation where the retainer may get bulged radially at the diametral opposing abutment ends of the retainer halves.

Another split type of the roller bearing cage is disclosed in Published Unexamined Utility Model Application in Japan No.H06-6 746, in which an annular cage of true round is split into two halves along a diametral plane lying on the circumferential midway points of any two diametral opposing cage bars. The cage halves are covered with any coating material of a preselected thickness at their at least any one side of split ends that come into circumferential abutment against one another.

Moreover, Published Unexamined Patent Application in Japan No.H09-72 332 discloses a connecting-rod bearing construction for marine engines, in which a needle bearing for a rod big-end is composed of a pair of semicircular cage halves, which come into abutment against each other to form a completely circular cage.

None of the prior bearing cages of split type recited earlier, nevertheless, succeeds in overcoming a major problem in which the split cage is much subject to deformation of bulging radially outwardly at the abutment ends of the cage halves owing to large centrifugal force taking place when the bearing revolves at high speed. This will cause the bearing to seat improperly in the bore surface in the rod big-end of the connecting rod, thus resulting in bearing failure such as lack of lubricating oil, seizing or binding between the bearing and the connecting rod, and so on.

An example of the prior bearing cages of split type envisaged to resolve the problem stated just above is illustrated in FIG. 11. The prior split-type bearing cage 40 is generally composed of a pair of semicircular cage halves 41, which are chamfered at a corner 39 where the abutment ends of the semicircular cage halves 41 merge with the outside peripheral surface of the cage. Rollers 43 are installed in pockets arranged circumferentially of the cage.

With the prior bearing cages of split type constructed as stated earlier, chamfering work on the corners is done to the semicircular cage halves 41, separately, which have been previously prepared by splitting a cylindrical cage stock. This chamfering procedure is much unfavorable for precision control of the chamfered area 39 in size. Thus, not only the chamfered area 39 get scattered in their sizes, but also an edge where the chamfered area merges with the associated outside periphery 42 of the cage will tend to be made much sharp. The tendency will cause any likelihood of raising the lack of lubricating oil, the seizing of bearing and so on at the abutment ends 38 and any area nearby the ends. With the prior bearing cages of split type, moreover, as the cylindrical cage is usually subject to heat treatment in preparatory to cutting into semicircular cage halves 41, the resulting cage halves can't help spreading somewhat radially outwardly at the time of cutting. This also makes it tough to prepare the chambered area at the corner with high precision.

SUMMARY OF THE INVENTION

The present invention has for its primary object to resolve the major problem as stated earlier, and to provide a roller bearing cage of split type, which serves useful functions for bearings in, for example a connecting rod in high-compression, high-speed engine and more particularly to a roller bearing cage that is easy in fabrication thereof and precision control of a chamfered area, and further much favorable for the bearings, which are needed to stand up to the harsh conditions imposed by high-compression, high-speed engines.

The present invention is concerned with a roller bearing cage in which a cylindrical cage is split along any diametral plane thereof into a pair of two semicircular cage halves that are arranged in opposition to each other with their mating ends coming into abutment against each other: comprising that the semicircular cage halves are each composed of semicircular rims arranged in a way spaced axially apart from each other and extended circumferentially in parallel with each other, and cage bars positioned between the semicircular rims at regular intervals around curved surfaces of the rims and made integrally with the rims to form a pocket between any two adjacent cage bars, in which a roller is accommodated for rotation; the semicircular cage halves are chamfered off at any outer peripheral areas nearby the mating ends thereby to form chamfered even areas; and the chamfering operation is done preparatory to cutting off the cylindrical cage into two semicircular cage halves.

In one aspect of the present invention there is disclosed a roller bearing cage in which the chamfered even areas on the outer peripheral areas are roughly normal to the mating ends of the semicircular cage halves and also lying on planes that extend in parallel with each other in diametral opposition.

In another aspect of the present invention, there is disclosed a roller bearing cage in which the cage bar having the mating end thereon is roughly equal in circumferential width with other cage bar. Moreover, the cage bars are arranged with their outside surfaces being in flush relation with the outside peripheries of the rims.

In another aspect of the present invention there is disclosed a roller bearing cage in which the cage bar has an inside surface that is sunk at an axial middle area thereof to form a recess extending in depth radially outwardly beyond a diameter across pitch circle on the rollers and in axial length shorter than the pocket, so that the cage bar is made slender at the middle area thereof on account of the recess, with leaving axially opposing ends thereof thick, and circumferentially opposing cheeks of the thick ends provide guide surfaces on which the roller rolls.

In another aspect of the present invention there is disclosed a roller bearing cage in which on the thick ends of the cage bar there are provided outside retainer lugs that jut into the pocket to keep the roller against outward escape out of the associated pocket and inside retainer lugs that also jut into the pocket to keep the roller against inward escape out of the associated pocket.

In another aspect of the present invention there is disclosed a roller bearing cage in which an annular corner where the inside peripheral surface and any one end of the axially opposing end surfaces of the semicircular rims merge with each other is chamfered off into a depth reaching two-thirds an axial thickness of the associated rim to form a slant annular surface, which slopes to a plane normal to an axial direction of the rim, with an angle less than 45 deg.

In another aspect of the present invention there is disclosed a roller bearing cage in which the edge where the outer periphery of the semicircular rim and the cage bar merges with the associated mating end is chamfered off. The chamfering operation on the areas nearby the mating ends, since done prior to cutting off the cylindrical cage into two halves, allows preparing the chamfered even areas that extend equally over both the semicircular cage halves. Chamfering the edges nearby the mating ends, thus, is beneficial in preventing the bore inside surface in the rod end of the connecting rod against the interference with such edges during rotation of the roller bearing cage, thereby making sure of smooth revolution of the roller bearing cage.

In another aspect of the present invention there is disclosed a roller bearing cage in which a corner where the axial end surface of the semicircular rim merges with the outside periphery of the semicircular rim is slightly rounded.

In a further another aspect of the present invention there is disclosed a roller bearing cage wherein a cylindrical cage is composed of a pair of annular rims arranged in a way spaced axially apart from each other and extended circumferentially in parallel with each other, and cage bars positioned between the annular rims at regular intervals around curved surfaces of the rims and made integrally with the rims to form a pocket between any two adjacent cage bars, in which a roller is accommodated for rotation; the cage bars are arranged with their outside surfaces being in flush relation with the outside peripheries of the rims; the cage bar has an inside surface that is sunk at an axial middle area thereof to form a recess extending in depth radially outwardly beyond a diameter across pitch circle on the rollers and in axial length shorter than the pocket, so that the cage bar is made slender at the middle area thereof on account of the recess, with leaving axially opposing ends thereof thick, and circumferentially opposing cheeks of the thick ends provide guide surfaces on which the roller rolls, and further wherein on the thick ends of the cage bar there are provided outside retainer lugs that jut into the pocket to keep the roller against outward escape out of the associated pocket and inside retainer lugs that also jut into the pocket to keep the roller against inward escape out of the associated pocket.

In another aspect of the present invention there is disclosed a roller bearing cage in which an annular corner where the inside peripheral surface and any one end of the axially opposing end surfaces of the annular rims merge with each other is chamfered off into a depth reaching two-thirds an axial thickness of the associated rim to form a slant annular surface, which slopes to a plane normal to an axial direction of the rim, with an angle less than 45 deg. Moreover, a corner where the axial end surface of the annular rim merges with the outside periphery of the annular rim is slightly rounded.

In another aspect of the present invention there is disclosed a roller bearing cage in which the slender area of the cage bar is defined in a manner having an inside surface of an axial length extending over a range of from 50% to 80% of an axial length of the pocket.

In another aspect of the present invention there is disclosed a roller bearing cage in which a slant surface connecting the slender area and any one of the thick ends is set to slope to a plane normal to the slender area, with an angle less than 45 deg.

In another aspect of the present invention there is disclosed a roller bearing cage in which the outside retainer lugs formed on the thick ends of the cage bar are designed in such a manner that their radially outside tops are held in flush relation with the outer periphery of the cage bar.

In another aspect of the present invention there is disclosed a roller bearing cage in which an axially middle area of the cage bar is reduced sidewise on circumferentially opposing cheeks thereof to enlarge widthwise the pocket.

In a further another aspect of the present invention there is disclosed a roller bearing cage in which the cage is made in an outside guide construction in which the outside periphery thereof is guided along a bore surface in a rod end of a connecting rod.

With the roller bearing cage of split type constructed according to the present invention, the chamfering operation on the areas nearby the mating ends of the two cage halves is done preparatory to cutting off the cylindrical cage stock into two cage halves. The machining process stated earlier is beneficial in keeping the resulting chamfered areas against getting scattered in their sizes. Thus, this renders the high-precision measurement of the chamfered areas easier, and making sure of process management of material-removal work to make the chamfered areas into a preselected shape. The chamfering operation done on the cage stock prior to the cutoff process, moreover, makes it possible to finish the chamfered areas on the outside periphery with high accuracy. Besides, the chamfered areas are made substantially even and therefore it will be easy to machine any bound between the chamfered even area and the curved surfaces around the roller bearing cage into a smoothly round area. Machining the bound where the chamfered even area merges with the curved surface of the outer periphery into any smooth and round surface serves well to bypass any issue that the outer periphery of the cage might otherwise come into unevenly forced seat at the bounds thereof against the bore surface in the rod big-end of the connecting rod, along which the rollers roll. Thus, the split cage of the present invention is constructed to carry effectively the loads imposed by modern high-speed engines, with no bearing failure.

Cutting off the cylindrical cage stock into two cage halves is done using a wire-electric discharge machining in which the kerf or width of cut is small with a consequently less removal in material than other traditional cutoff machining operations. Thus, the wire-electric discharge machining is in favor of splitting accurately the cage stock into two semicircular cage halves. Chamfering operation using the wire-electrode is preferable for Simplifying the machining operations, with even making high-accuracy machining possible.

The roller bearing cage constructed as stated earlier weighs less, making the outer periphery of the cage larger in size, and also is made small in surface-to-surface contact stress that might take place between the bore surface in the rod big-end of the connecting rod and the outer periphery 22 of the roller bearing cage 1, thus, favorable for carrying the loads imposed by the high-speed revolution, with no occurrence of bearing failure such as the lack of lubricating oil, the seizing of bearing and so on.

Other objects and features of the present invention will be more apparent to those skilled in the art on consideration of the accompanying drawings and following specification wherein are disclosed preferred embodiments of the invention with the understanding that such variations, modifications and elimination of parts may be made therein as fall within the scope of the appended claims without departing from the spirit of the invention.

DETAILED DESCRIPTION OF THE PREFERRED EMBODIMENTS

Referring now in detail to FIGS. 1 to 9, a preferred embodiment of a roller bearing cage according to the present invention will be explained below.

Figure 6:
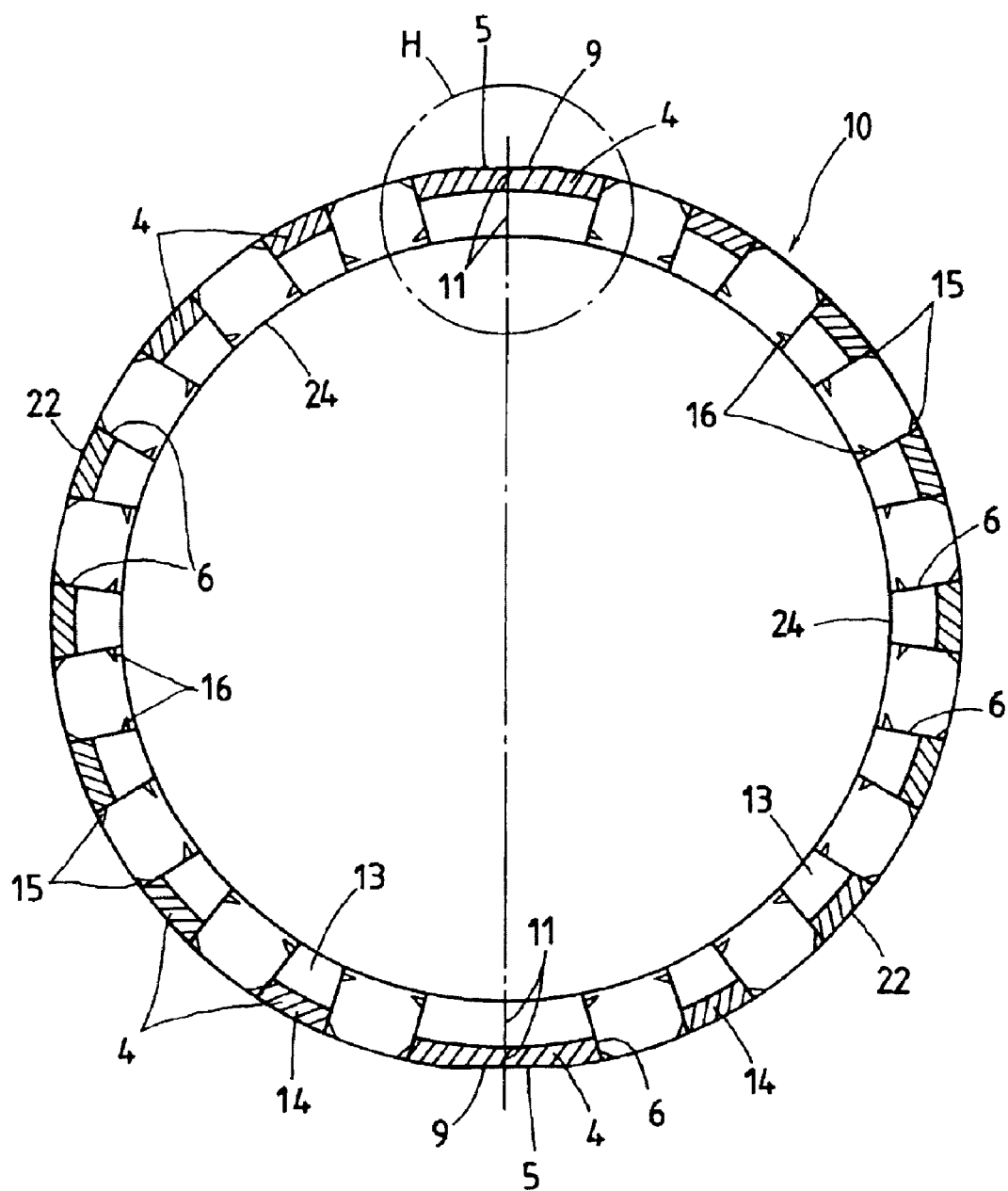
FIG. 6 is a traverse cross-section illustrating a cylindrical cage stock taken on the plane perpendicular to an axial direction thereof, which is shown preparatory to splitting into two semicircular cage halves to produce the roller bearing cage of the present invention.
Figure 7:
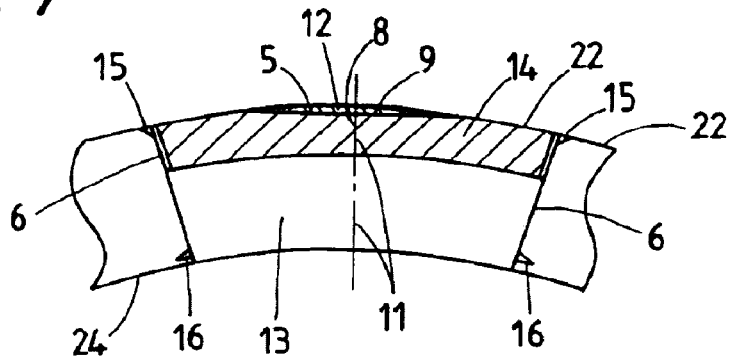
FIG. 7 is an enlarged fragmentary view illustrating a chamfered area encircled with character H in FIG. 6.

With the embodiment constructed as stated later, a roller bearing cage 1 is of the split type that mainly comprises a pair of semicircular cage halves 2 and has features of configuration, especially, at abutment ends 8 and areas nearby the ends. The roller bearing cage 1 is made of a cylindrical cage stock 10, which is split into two cage halves by cutting-off work to form a pair of semicircular cage halves 2. The cylindrical cage stock 10, as illustrated in FIGS. 6 and 7, is cut off at diametral opposing chamfered areas 9, in more detail, along a diametral plane 11 lying on circumferential midway points of the two diametral opposing cage bars 4 each of which is twice any other cage bar 4 in circumferential width. Each of the paired semicircular cage halves 2 fits into a bore in the rod end of the connecting rod in such a way coming into mutual abutment against the counterpart thereof at their mating ends 8 to form a cylinder thereby to complete the roller bearing cage 1.

The semicircular cage halves 2 are each composed of a pair of semicircular rims 3 spaced apart from each other in a way extending circumferentially in parallel with each other to keep a preselected axial interval between them, and cage bars 4 positioned at regular intervals around the curved surface of the rims 3 and connected integrally to the rims 3 to form a window or pocket 6 between any two adjacent cage bars 4, in which a roller 7 such as a needle roller is laid. At mating ends 8 of the semicircular cage halves 2, there are shown both the rims 3 and the cage bar 4, which are partially shaved down at an outer periphery 22 of the associated semicircular cage half 2 in a manner providing a chamfered even area 9 at a radially outside corner 5 and an area nearby the corner 5 of any mating end 8 of the semicircular cage half 2. Moreover, it is preferable to grind away an edge 23, where the radially outside corner 5 merges with the associated mating end 8, into a rounded edge 23C.

Chamfering work at the radially outside corner 5 nearby the mating end 8 to provide the chamfered even area 9 there is performed on the cylindrical cage stock 10 shown in FIG. 6, preparatory to splitting the stock 10 into two semicircular cage halves 2, by cutting away a desired volume of material from the outside periphery 22 of the cage stock 10 in a way making the chamfered even area 9 that extends axially of the cage stock 10 over a circumferential width in sidewise symmetry with respect to a diametral plane 11 lying on a cutoff line along which the cage stock 10 will be split into two cage halves 2. The volume 12 removed from the outside periphery 22 of the cage stock 10 is determined in light of an amount of deformation that might occur in the roller bearing split-cage 1, a centrifugal force that might be exerted due to any high-speed revolution on the roller bearing split-cage 1 fit in the rod end of the connecting rod, and so on. Making the chamfered even area 9 on the cylindrical cage stock 10 before split-up process makes it possible to form two chamfered even areas 9 on the outside periphery of the cage stock 10 in accurately diametral opposition to one another. This renders the high-precision measurement of the chamfered area 9 easier, thus helping the process management of material-removal work to make the chamfered even areas 9 into a preselected shape. The chamfering operation done on the cage stock prior to the cutoff process, moreover, makes it possible to finish the chamfered even areas 9 on the outside periphery 22 with high accuracy. Besides, any bound between the chamfered even area 9 and the curved surfaces extending over the rim 3 and the cage bar 4 is preferably made into a smoothly round area.

As only two diametrically opposing cage bars 4 where the cylindrical cage stock 10 will be cut off into two cage halves 2 has a circumferential width twice other cage bars 4, any circumferentially terminal cage bar 4 with the mating end 8 of the semicircular cage half 2 is roughly equal in circumferential width with other cage bars 4. With the semicircular cage halves 2 constructed as stated just above, since the mating end 8 is provided by the combination of the semicircular rims 3 and the terminal cage bar 4 that is not less in sidewise width than other cage bars 4, there is no practical issue in mechanical strength. Cutting off the cylindrical cage stock 10 is done using for example a wire-electric discharge machining. As modern advanced wire-electric discharge processors use a thin wire electrode as small as, for example 0.1 mm in diameter, the kerf or width of cut is small with a consequently less removal in material than other traditional cutoff machining operations. Thus, the wire-electric discharge machining is in favor of splitting accurately the cage stock 10 into two semicircular cage halves 2.

Figure 8:
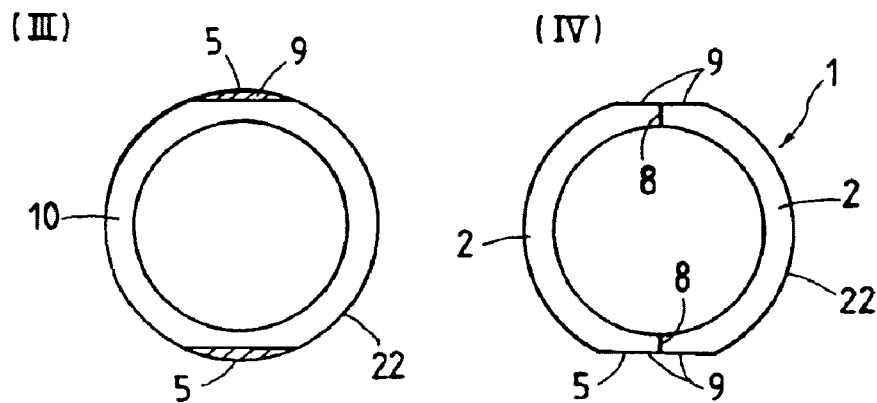
FIG. 8 is a schematic illustration explanatory of a chamfered area on an outside periphery of the roller bearing cage according to the present invention in comparison with cage stock preparatory of chamfering.

The shaded portions on the cage stock 10 in FIG. 8(III) are first chamfered off using the wire-electric discharge machining to provide the chamfered even areas 9, which are in diametral opposition to each other. Then, the cage stock 10 is split into two semicircular cage halves 2 along the axial cutoff plane 11 in FIG. 8(IV) by the action of the wire-electric discharge machining using a thin wire. At the same time, grinding away the edge 23 into the rounded edge 23C by the use of the thin wire-electrode is preferable for simplifying the machining operations, with even making high-accuracy machining possible. It will be appreciated that any material removal operations other than the wire-electric discharge machining may be used for the chamfering works on the outer periphery of the cage stock 10 and the edges 23 of the semicircular cage halves 2.

Figure 1:
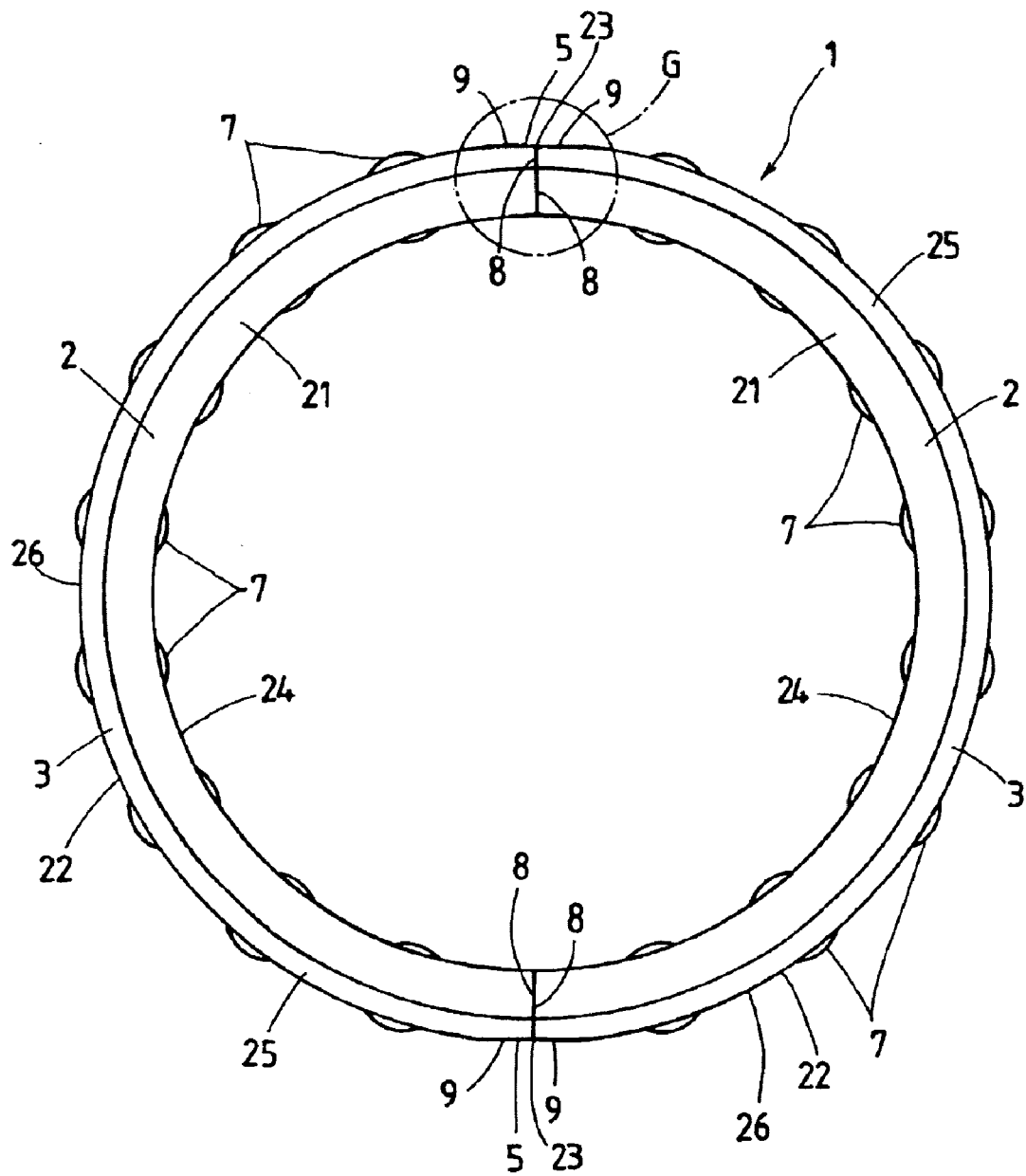
FIG. 1 is a front elevation showing a preferred embodiment of a roller bearing cage according to the present invention.
Figure 2:
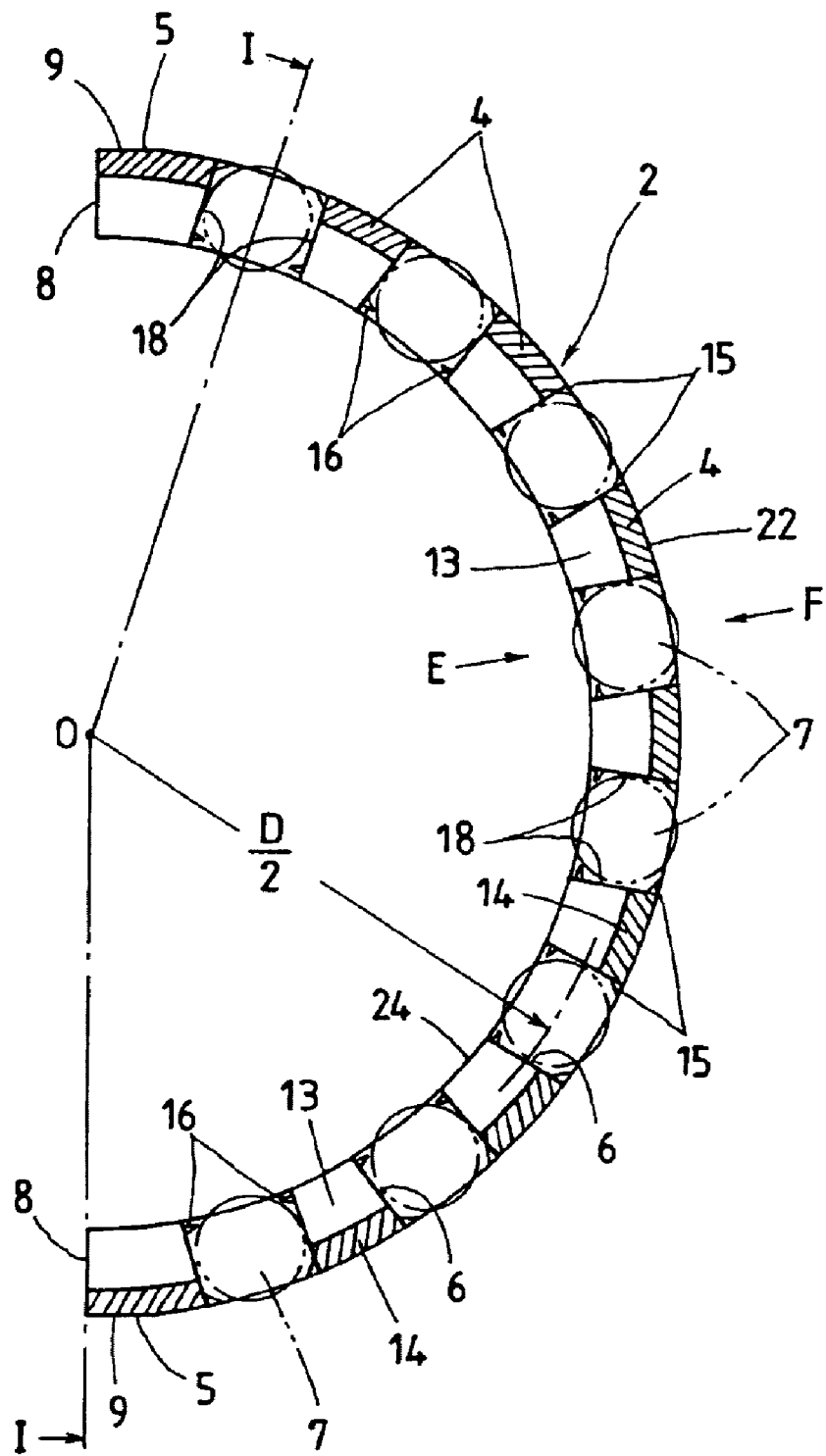
FIG. 2 is a traverse cross-section illustrating any one of semicircular cage halves, taken on the plane perpendicular to an axial direction of the roller bearing cage shown in FIG. 1.
Figure 5:
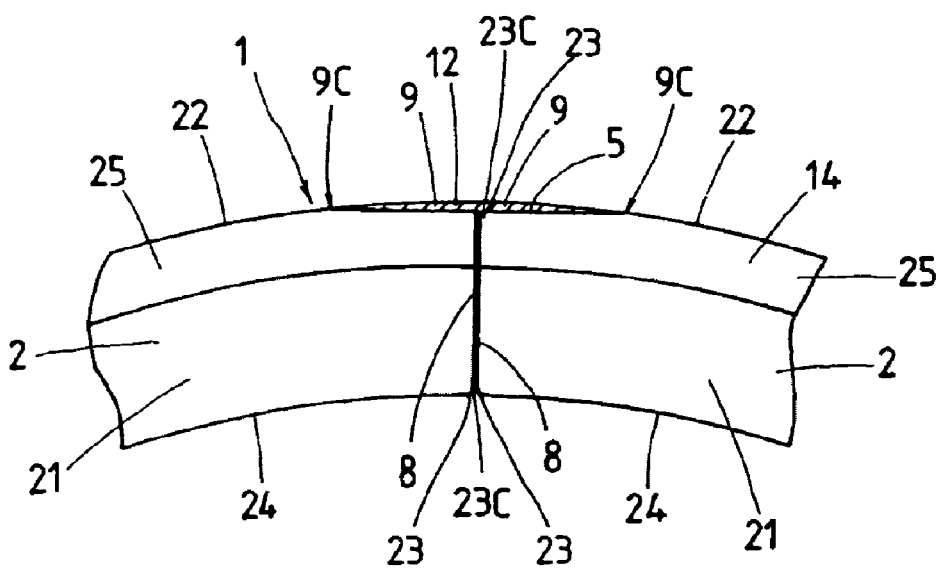
FIG. 5 is an enlarged fragmentary view illustrating a chamfered area encircled with character G in FIG. 1.

As seen from FIG. 5 in which a chamfered area encircled with character G in FIG. 1 is shown as being enlarged, the chamfered even area 9 may be finished with accuracy by the removal of a specified portion at 12 from the outer periphery 22 of the cage stock 10 in such a way preparing a substantially even surface. Moreover, while a bound 9C where the chamfered even area 9 merges with the curved surface of the outer periphery 22 is made into any smooth and round surfaces, the edge 23 where the chamfered area 9 meets the mating end 8 is machined to end in a gently round corner 23C rather than in a sharp corner. The split cage 1 machined as stated earlier may be free from any issue that the outer periphery 22 of the cage 1 might come into unevenly forced seat at the bounds 9C thereof against the bore surface in the rod big-end, along which the balls roll. Thus, the split cage of the present invention is constructed to carry effectively the loads imposed by modern high-speed engines, with no bearing failure such as lack of lubricating oil at the mating ends 8 and any area nearby the ends.

Figure 3:
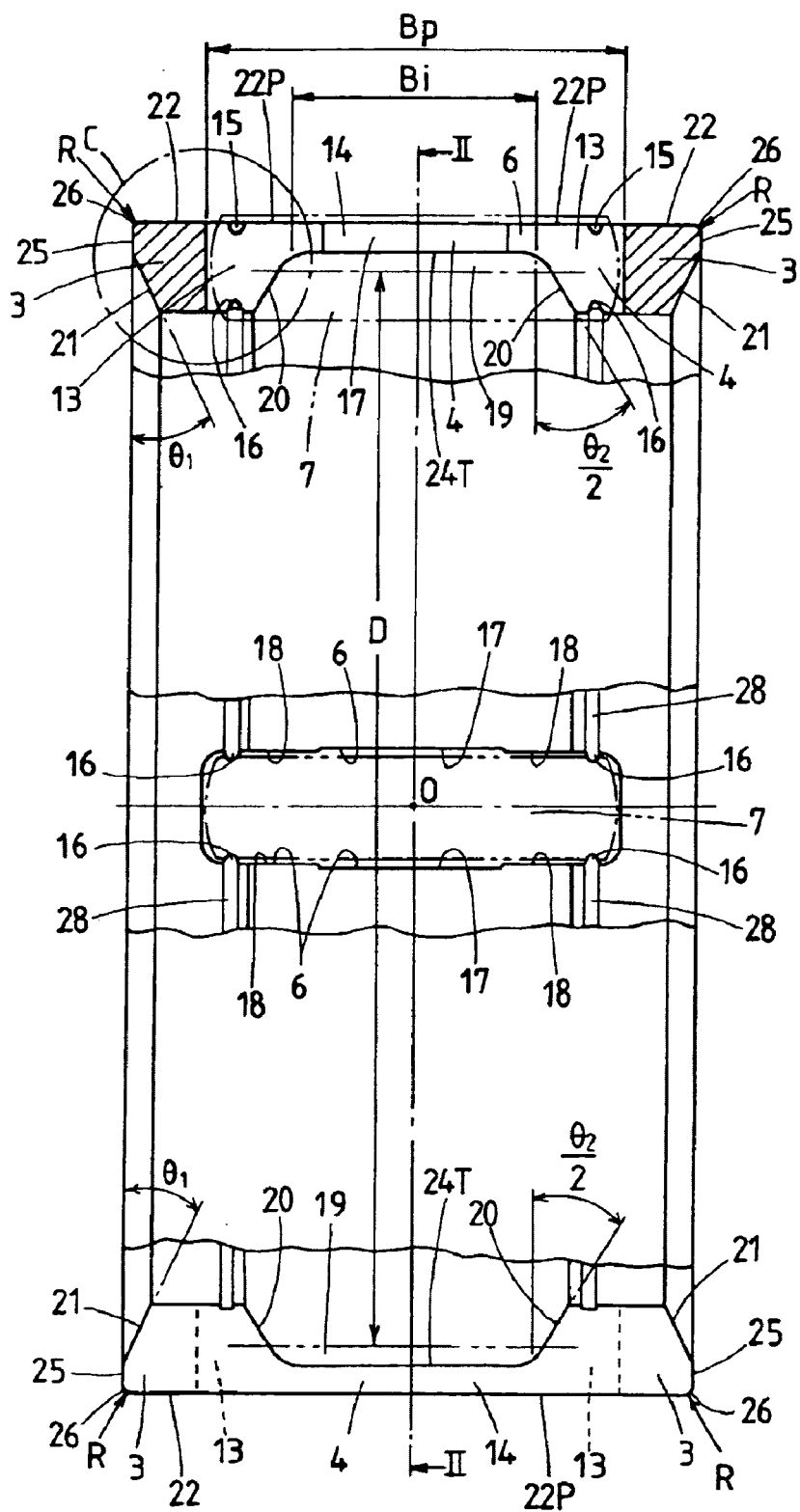
FIG. 3 is a view, partially broken away, of the semicircular cage half of FIG. 2 taken along the plane I—I as seen looking into the inside thereof in the direction of an arrow E of that figure.
Figure 4:
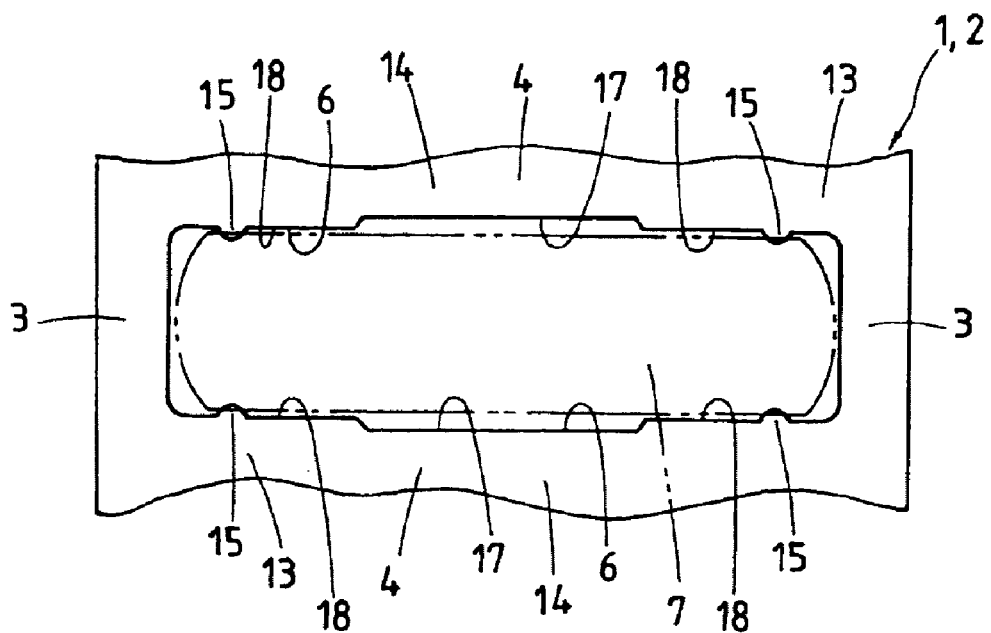
FIG. 4 is a fragmentary plan view of the semicircular cage half of FIG. 2 as seen in the direction of an arrow F of that figure.

The cage bar 4, as shown in FIG. 3, is arranged in a way that its radially outside surface 22P is flush with the outer periphery 22 of the semicircular rim 3, so that the cage bar is held in a flush relation with the outer periphery 22 of the semicircular rim 3 over the overall length thereof. The cage bar 4 also has a radially inside surface 24 that is sunk at an axial middle area thereof to form a recess 19 extending in depth radially outwardly beyond a diameter D of pitch circle of the successive rollers 7, or a distance D across pitch circle on the diametrally opposite rollers 7 and in axial length shorter than the associated pocket 6. Provision of the recess 19 on the inside surface 24 of the cage bar 4, therefore, results in making the cage bar 4 slender at the middle area 14 thereof, with leaving the axially opposing ends 13 thereof thick. Circumferentially opposing cheeks of the thick ends 13 define the window or pocket 6 and at the same time provide guide surfaces 18 on which the roller 7 rolls.

On the thick ends 13 of the cage bar 4 there are provided outside retainer lugs 15 that jut into the pocket 6 to keep the roller 7 against outward escape out of the associated pocket 6 and inside retainer lugs 16 that also jut into the pocket 6 to keep the roller 7 against inward escape out of the associated pocket 6. The inside retainer lugs 16 are made by coining grooves 28 on the inside circumferential surface 24 of the cage bar 4 with the use of, for example knurling tools and so on to extrude the material into the associated pocket 6. Moreover, the outside retainer lugs 15 formed on the thick ends 13 of the cage bar 4 are designed in such a manner that their radially outside tops are held in flush relation with the outer periphery 22 of the cage bar 4.

Figure 9:
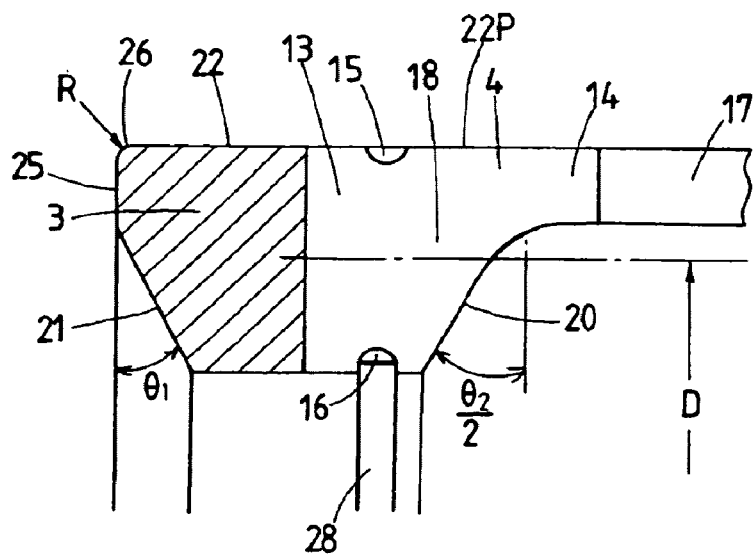
FIG. 9 is an enlarged fragmentary view illustrating in detail a part encircled with character H in FIG. 3.

As shown in FIGS. 3 and 9, the slender area 14 of the cage bar 4 is defined in a manner having an inside surface 24T of an axial length Bj extending over a range of from 50% to 80%, preferably roughly 60% as illustrated here, of an axial length Bp of the pocket 6. On the inside peripheral surface 24 of the cage, a slant surface 20 connecting the slender area 14 and any one of the thick ends 13 is set to slope to a plane normal to the slender area 14, with an angle ($\theta_2/2$) less than 45 deg. Preferably, the angle ($\theta_2/2$) is set at 30 deg as illustrated here. An annular corner where the inside peripheral surface 24 merges with any one end of the axially opposing end surfaces 25 of the semicircular rims 3 is chamfered off into a depth reaching two-thirds the axial thickness of the associated rim 3 to form a slant annular surface 21, which slopes to a plane normal to the axial direction of the rim 3, with an angle $\theta_1$ less than 45 deg. That is to say, the chamfered slant surface 21 on the semicircular rim 3 starts at an annular line on the inside periphery of the semicircular rim 3, which is spaced apart from an axially inside end plane perpendicular to the axial direction by two-thirds the axial distance on the of the semicircular rim 3. The corner 23 where the end surface normal to the axial direction merges with the outside periphery 22 of the semicircular rim 3 is slightly rounded. Besides, it is to be noted that the corner 23 where the end surface normal to the axial direction merges with the outside periphery 22 of the semicircular rim 3 should be rounded to such an extent that there is no occurrence of interference or engagement with an corner R of the crankpin integral with the crankshaft, which will fit over the rounded corner 23.

Moreover, an axially middle area of the cage bar 4 is reduced sidewise on circumferentially opposing cheeks thereof to enlarge at 17 widthwise the pocket 6, thus allowing lubricating oil to flow through there. This construction contributes to making the lubricating oil easier to flow around the rollers. An annular corner 26 where the axial end surface 25 merges with the outside periphery 22 of the semicircular rim 3 is slightly rounded.

A pair of semicircular cage halves 2 is constituted with the cage bars 4 and semicircular rims 3, which are constructed as stated just above. Only assembling the semicircular cage halves 2, with the mating ends 8 thereof coming into abutment against their counterparts may provide the roller bearing cage 1, which weighs less and also makes the outer periphery 22 of the cage 1 larger in size. The roller bearing cage 1 completed as stated earlier is made small in surface-to-surface contact stress that might take place between the bore surface in the rod big-end of the connecting rod and the outer periphery 22 of the roller bearing cage 1 owing to the centrifugal force caused by the high-speed revolution, thus, favorable for carrying the loads imposed by the high-speed revolution, with no occurrence of bearing failure such as the lack of lubricating oil, the seizing of bearing and so on. The rollers 7 are each allowed to roll certainly with less skew on account of the associated guide surfaces 18 made on the circumferentially opposing cheeks of the thick ends 13. In addition, as the thick ends 13 of the cage bar 4 are provided with the outside and inside retainer lugs 13, 15, the rollers 7 are kept against direct contact with the cage bars even if the guide surfaces 18 are somewhat subject to wear. There is no possibility of interference with the retainer lugs 15, 16. The rollers 7, as held against escape out of the roller bearing cage 1, may be handled or treated with ease despite the cage 1 being split into paired semicircular cage halves 2.

The roller bearing cage constructed as stated earlier weighs less, with even making sure of the guide surface that rivals the prior roller guide surface. The roller bearing cage of the present invention, moreover, is so constructed as to help ensure stiffness in the semicircular rim 3, especially increase in modulus of longitudinal section, and also make the outer periphery of the roller bearing cage 1 increased in area. Thus, the present invention provides the roller bearing cage that can carry the loads imposed by high-compression, high-speed engines, despite being split into two cage halves.

The roller bearing cage 1 constructed as stated earlier will be produced according to the following processing steps:

1. Any metal stock such as tubular member and so on is made into a preselected configuration such as a cylindrical member and so on by turning operation;
2. The resulting cylindrical member is made with pockets 7 by pressing operation;
3. The cylindrical member is then made with the outside and inside retainer lugs by coining operation;
4. The cylindrical member is subjected to grinding operation on the axially opposing end surfaces thereof to have a preselected axial length;
5. The cylindrical member is roughly ground around the outer periphery thereof;
6. The ground cylindrical member is subjected to heat-treatment;
7. The cylindrical member is finished around the outer periphery thereof by grinding operation;
8. The cylindrical member is first chamfered off at specified areas on the outer periphery thereof, where the cylindrical member will be split into two halves, and then separated into the two halves by cutoff operation with wire-electric discharge machining to make a pair of semicircular cage halves 2;
9. The split two halves are trimmed to remove any irregular edge caused by the wire-electric discharge machining operation;
10. The semicircular cage halves 2 are subjected to surface treatments by plating the whole surfaces of the semicircular cage halves 2; and
11. Rollers 7 are each fit in the associated pocket 6 from the outside of the semicircular cage halves 2 in a snapping way deforming elastically the outside retainer lugs.

Figure 10:
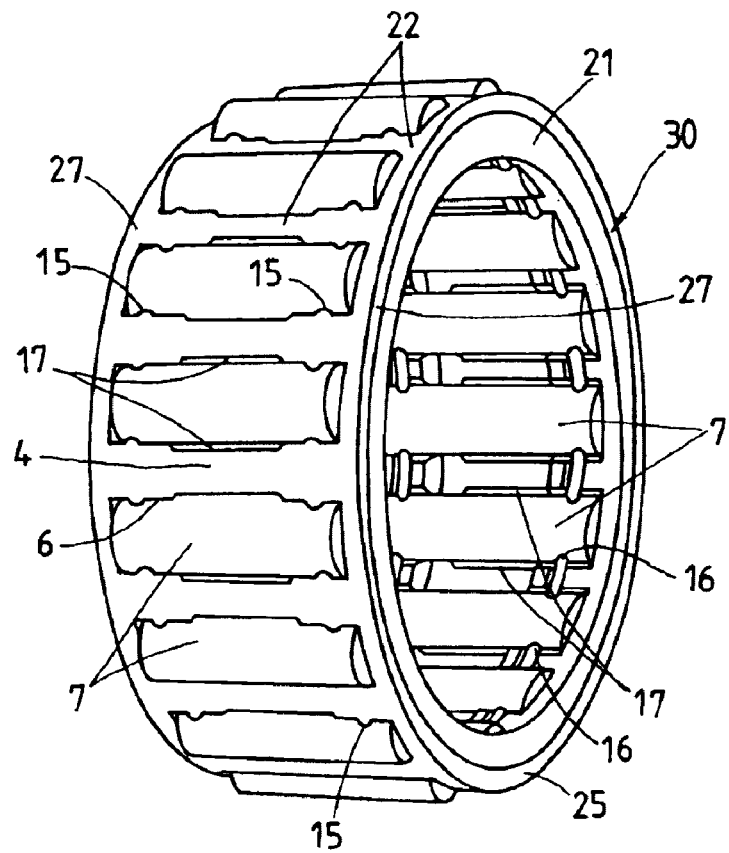
FIG. 10 is perspective view illustrating another embodiment of the roller bearing cage according to the present invention, which is a unitary type holding therein more than one roller.
Figure 11:
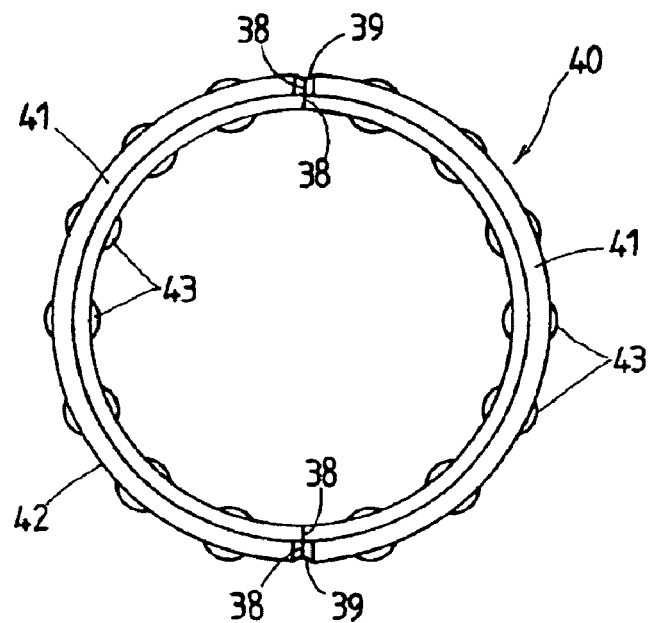
FIG. 11 is a front elevation of a prior roller bearing cage to explain chamfered areas worked on the semicircular cage halves.

Finally referring to FIG. 10, there is shown another embodiment of the roller bearing cage according to the present invention. A roller bearing cage 30 is of unitary construction in return for the split cage composed of a pair of semicircular cage halves 2. The roller bearing cage 30 is truly identical with the roller bearing split-cage 1 stated earlier in configurations of the cage bars 4 and the rims 27, except that the rims 27 are not split into two halves so that they don't have the mating ends 8, which have been prepared on the diametrally opposing ends of the semicircular cage halves 2 in the first embodiment stated earlier. The roller bearing cage 30 according to the second embodiment, as with the roller bearing split-cage 1 according to the first embodiment stated earlier, also has the performance favorable for the high-speed engines.

While the present invention has been described in its preferred embodiments, it is to be understood that the words which have been used are words of description rather than limitation and that changes within the purview of the appended claims may be made without departing from the true scope and spirit of the invention in its broader aspect.

What is claimed is:

1. A roller bearing cage wherein a cylindrical cage is composed of a pair of annular rims arranged in a way spaced axially apart from each other and extended circumferentially in parallel with each other, and cage bars positioned between the annular rims at regular intervals around curved surfaces of the rims and made integrally with the rims to form a pocket between any two adjacent cage bars to accommodate a roller for rotation; the cage bars are arranged with their outside surfaces being in flush with the outside peripheries of the rims across an overall length of the cage; the cage bar has an inside surface that is sunk at an axial middle area thereof to form a recess extending in depth radially outwardly beyond a diameter across pitch circle on the rollers and in axial length shorter than the pocket, so that the cage bar is made slender at the middle area thereof on account of the recess, with leaving axially opposing ends thereof thick, the axially opposing thick ends are provided on circumferentially opposing cheeks thereof with guide surfaces on which the roller rolls, and further wherein on the thick ends of the cage bar there are provided outside retainer lugs that jut into the pocket to keep the roller against outward escape out of the associated pocket and inside retainer lugs that also jut into the pocket to keep the roller against inward escape out of the associated pocket, wherein an annular corner where the inside peripheral surface and any one end of the axially opposing end surfaces of the annular rims merge with each other is chamfered off into a depth reaching two thirds a thickness on the end surface of the associated annular rim from the inside peripheral surface of the annular rim, which slopes to a plane normal to an axial direction of the rim, with an angle less than 45 deg, wherein a corner where the axial end surface of the annular rim merges with the outside periphery of the annular rim is slightly rounded, wherein the slender area of the cage bar is defined in a manner having an inside surface of an axial length extending over a range of from 50% to 80% of an axial length of the pocket, and wherein a slant surface connecting the slender area and any one of the thick ends is set to slope to a plane normal to the slender area, with an angle less than 45 deg.

2. A roller bearing cage constructed as defined in claim 1, wherein the outside retainer lugs formed on the thick ends of the cage bar are designed in such a manner that their radially outside tops are held in flush relation with the outer periphery of the cage bar.

3. A roller bearing cage constructed as defined in claim 1, wherein the axially middle area of the cage bar is reduced sidewise on circumferentially opposing cheeks thereof to enlarge widthwise the pocket.

* * * * *